May 21, 1968     J. H. CHMIELEWSKI     3,383,755
BEARING PULLER DEVICE
Filed Sept. 1, 1967
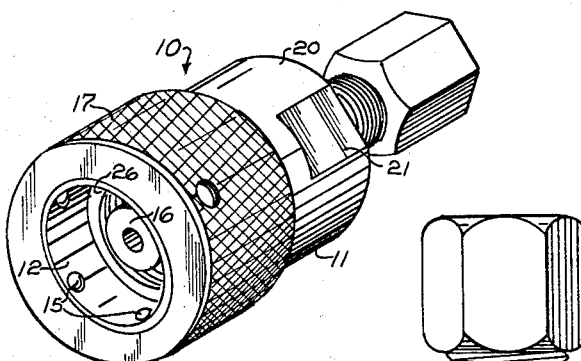
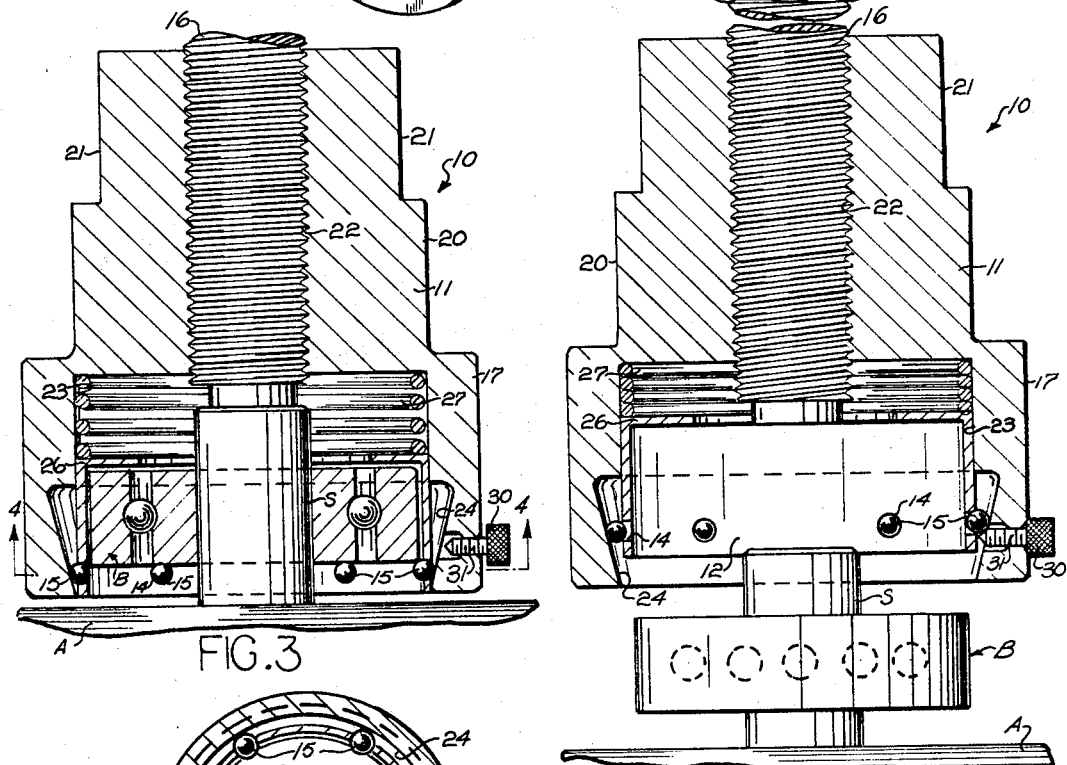
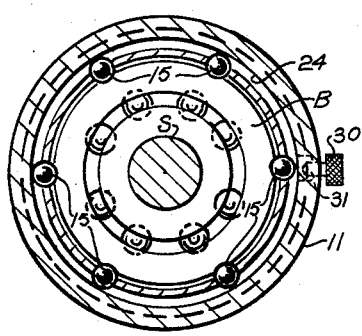
INVENTOR.
JERRY H. CHMIELEWSKI
BY
Young, Raney, Flynn and Tarolli
ATTORNEYS

United States Patent Office 3,383,755
Patented May 21, 1968

3,383,755
BEARING PULLER DEVICE
Jerry H. Chmielewski, 7311 Filbert Lane,
Tampa, Fla. 33610
Filed Sept. 1, 1967, Ser. No. 665,150
6 Claims. (Cl. 29—264)

ABSTRACT OF THE DISCLOSURE

A device 10 for pulling bearings and the like from shafts comprising, a relatively rigid body 11 having a recess 23 in one end thereof, a sleeve member 12 slidably received in the recess and a spring 27 interposed between the sleeve and an inner end wall of the recess urging the sleeve outwardly, the sleeve member having radially extending openings 14 therethrough with lock members 15 in each of the openings and shiftable radially of the sleeve member in the openings and adapted to move into and out of the interior of the sleeve member to lock a bearing in the sleeve, and cam means cooperating with the lock members for urging the members radially inwardly of the sleeve member as the sleeve member moves outwardly of the recess. The sleeve may be retained by a set screw 30 in its inner position in which the balls are retracted to permit a shaft S and bearing B in the shaft to be received within the sleeve. The balls move inwardly to lock the bearing in the sleeve when the sleeve moves outwardly of the recess. The body 11 and the sleeve with the bearing locked therein are moved outwardly along the shaft by force applied by a bolt 16 threaded into the body.

---

The present invention relates to a device for forcefully removing ball bearings, roller bearings or parts thereof from shafts and the like.

The principal object of the present invention is the provision of a new and improved device which may be readily connected with a bearing or a part thereof, such as a roller or a ball bearing, which is frictionally retained on a shaft and which device applies force to the bearing and shaft to forcefully remove the bearing from the shaft, the device comprising a body having a recess in one end adapted to receive the end of a shaft and the bearing thereon to be removed from the shaft, a sleeve-like member being axially movable in the recess and carrying one or more locking members in openings in the sides thereof and which locking members are forced radially inwardly of the sleeve by cam means in the walls of the recess when the sleeve is shifted axially outwardly of the recess to thereby lock the bearing in the sleeve, and having means to force the body and the sleeve containing the bearing from the shaft.

A further object of the invention is the provision of a device of the character described which is relatively inexpensive to manufacture, is easily manipulated for connection and disconnection with a bearing on a shaft, and which is rugged and durable.

Other objects and advantages of the invention will be apparent from the following description of a preferred form thereof, reference being made to the accompanying drawings wherein:

FIG. 1 is a perspective view of a bearing puller device;

FIG. 2 is a fragmentary sectional view of the device shown in FIG. 1 on a larger scale and showing the device about to be connected to a bearing on a shaft for removing the bearing from the shaft;

FIG. 3 is a view similar to FIG. 2, but showing the device engaged with the bearing on the shaft preparatory to the removal of the bearing; and FIG. 4 is a view taken substantially along line 4—4 of FIG. 3 and on a smaller scale.

It is common practice to attach roller bearings or ball bearings to rotatable shafts of various mechanisms, such as armature shafts of alternators, by press fitting the inner races of the bearings to the shafts. When it is necessary to remove a bearing from its shaft for repairs and the like, considerable force must be applied to the bearing in an axial direction of the shaft to slide the bearing from the shaft by overcoming the relatively high friction and adhesion existing between the engaged surfaces of the shaft and the bearing. The present invention is directed to a relatively simple, effective device for removing such bearings or parts thereof from shafts.

Referring to the drawings, a device 10 is shown which is adapted to remove bearings or parts thereof from shafts and which is constructed in accordance with the present invention. For purposes of illustrating the invention an armature shaft S of an alternator A is shown having a ball bearing B thereon which can be removed by the device 10, as described. In general, the device 10 comprises a body 11 having a recess in one end which is adapted to receive the end portion of the shaft S and the roller bearing B affixed thereto. A sleeve 12 is shiftable axially in the recess and its cylindrical side walls adjacent its lower end as viewed in FIGS. 2, 3 have openings 14 for receiving lock members 15 which are moved radially into and out of the sleeve by shifting the sleeve. The lock members move outwardly of the sleeve walls and permit free passage of the bearing into or out of the sleeve when the sleeve is positioned inwardly of the recess and move inwardly to prevent withdrawal of the bearing when the sleeve is moved outwardly relative to the recess. A knockout bolt 16 is threaded into the body and engages the end of the shaft and reacts against the shaft to draw the body, with the bearing B locked in the sleeve by the lock members, off the shaft.

More specifically, the body 11 is formed of steel, or the like, having a generally cylindrical form with the lower section 17 thereof, as viewed in FIGS. 2 and 3, of greater diameter than the upper section 20. Preferably, the outer surface of section 17 is knurled to afford a hand grip, and the section 20 has two flats 21 formed on opposite sides thereon by which a tool, such as a wrench, can grip the body and prevent rotation thereof relative to the knockout bolt 16.

The body 11 has a central bore 22, which is threaded to receive the bolt 16, and a cylindrical recess 23, in the lower portion and which is concentric to the bore 22 and opens at the lower end of the body. A section of the recess adjacent the open end is in the form of a conical section so as to provide side walls 24 which taper toward the opening. The maximum diameter of the conical section is somewhat greater than the diameter of the recess 23.

The sleeve member 12 is disposed within the recess 23 and is adapted to be guided for longitudinal movement therein, by the cylindrical wall sections of the recess.

The openings 14 in the walls of the sleeve member 12 are spaced equally about the sleeve and the centers thereof lie in a plane parallel to the plane of the outer end edge of the member, and which openings receive the lock members 15 comprising steel balls. The diameters of the balls 15 are slightly larger than the diameters of the openings so that the balls may project radially inwardly of the inner surfaces of the cylindrical sleeve but are restrained from passing into the sleeve. In these positions, the balls 15 are adapted to form abutments which block the passage of the bearing B out of the sleeve. The balls 15 are urged inwardly of the sleeve member 12 by the tapered wall surfaces 24 as the sleeve is shifted in a direction outwardly of the recess 23. Thus, when the body 11 is positioned over the end of the shaft S with the bearing B received in the sleeve 12, as seen in FIG. 3, by sliding the sleeve outwardly of the recess 23, the balls 15 are moved inwardly to lock the bearing in the sleeve.

The inner end of the sleeve member 12 has an internal annular flange 26 and a coil spring 27 is interposed between the inner end wall of the recess 23 and the flanges and urges the sleeve member outwardly of the recess.

The sleeve member 12 is adapted to be retained in its inner or retracted position, as seen in FIG. 2, by a set screw 30 which is threaded into an opening 31 formed in the side wall of the recess 23, so that the balls 15 are free to move outwardly of the sleeve walls whereby the bearing B may pass freely into and out of the sleeve.

In constructing the body 11, the opening 31 is formed of a diameter sufficient to pass the balls 15 therethrough so that in assembly of the sleeve 12 and the balls 15 into the body 11, the balls are dropped through the opening 31 and into the respective sleeve openings 14. After all of the balls 15 have been positioned in the sleeve openings, the outer end walls of the hole 31 are mashed to a diameter smaller than that of the balls and the hole is then threaded to receive the screw 30.

To remove the bearing B from the shaft S, for example, the sleeve 12 is moved to its retracted position and secured there by the screw 30, as shown in FIG. 2. The recess 23 of the body 11 is aligned with the shaft and moved so that the end of the shaft and the roller bearing B are received in the sleeve member 12. The screw 30 is then backed off from the sleeve 12 and the spring 27 urges the sleeve member outwardly causing the balls 15 to be forced radially inwardly and block removal of the bearing B from the sleeve and the recess. The screw 16 is then threaded into the bore 22 by use of a suitable wrench or the like while the body 11 is restrained from rotation by the application of a wrench to the flats 21 so that the bolt places considerable axial force against the outer end of the shaft S. Thus, the body 11, with the sleeve 12 is forced outwardly of the shaft S drawing the bearing B therewith. The bearing B is released from the recess 23 by sliding the sleeve 12 inwardly of the recess.

It will be apparent that the present invention provides an inexpensive, convenient and durable device for removing bearings and the like from shafts. Although but one form of the invention is shown and described, it will be understood that other forms, modifications, and adaptations thereof may be made all falling within the scope of the claims which follow.

Having described my invention, I claim:

1. A device for pulling bearings and the like from shafts comprising, a relatively rigid body having a recess in one end thereof, a sleeve member slidably received in said recess and comprising radially extending flanges at the end thereof toward the inner end of said recess, a spring interposed between said flanges and an inner end wall of said recess, said sleeve member having one or more radially extending openings therethrough, a lock member in each of said openings and shiftable radially of said sleeve member in said openings and adapted to move into and out of the interior of said sleeve member, and cam meas cooperating with said lock members for urging said members radially inwardly of said sleeve member as said sleeve member moves outwardly of said recess.

2. A device for pulling bearings or the like as defined in claim 1 further characterized by means carried by said body for engaging a shaft received in said opened end and for causing relative movement between said body and shaft.

3. A device for pulling bearings or the like as defined in claim 1 further characterized by the inner portion of said recess being cylindrical to guidingly receive said sleeve, and the outer section of said recess being in the form of a conical section having its maximum diameter adjacent said cylindrical section, said maximum diameter being greater than said cylindrical section.

4. A device for pulling bearings or the like as defined in claim 1 further characterized by a threaded opening extending radially through the wall of said recess, and a screw threaded in the last mentioned opening.

5. A device for pulling bearings or the like as defined in claim 3 further characterized by a threaded opening extending radially through the wall of said recess at said conical section, and a screw threaded in the last mentioned opening.

6. A device as defined in claim 4 further characterized by the maximum diameter of said threaded opening being greater than the diameters of said locking members.

References Cited

UNITED STATES PATENTS

| 2,373,307 | 4/1945 | Goddard et al. | 29—267 |
| 2,413,943 | 1/1947 | Bolduc | 29—243 |

FOREIGN PATENTS 218,396 12/1942 Switzerland.

MYRON C. KRUSE, *Primary Examiner.*